Nov. 27, 1934. R. S. BASSETT Re. 19,384
LIQUID PUMP
Original Filed Dec. 13, 1930
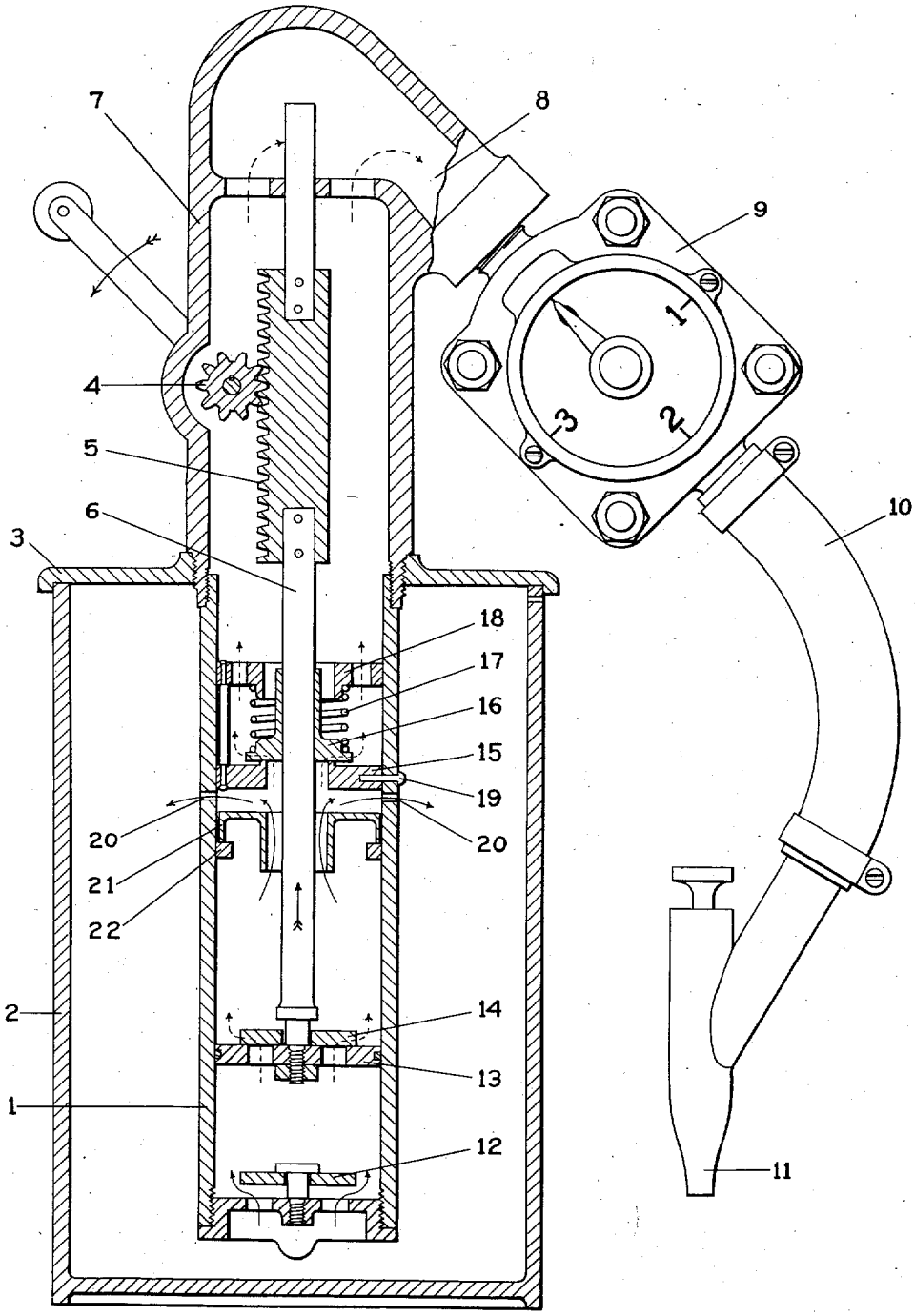
INVENTOR
Robt S. Bassett Reissued Nov. 27, 1934 Re. 19,384

UNITED STATES PATENT OFFICE 19,384

LIQUID PUMP

Robert S. Bassett, Buffalo, N. Y.

Original No. 1,816,821, dated August 4, 1931, Serial No. 502,138, December 13, 1930, Application for reissue March 7, 1933, Serial No. 659,986

19 Claims. (Cl. 221—95)

My invention relates to improvements in liquid pumps which will draw in both liquids and gases through the intake but from which the discharge of liquids only is desired from the outlet.

My invention relates more particularly to grease pumps for handling automobile transmission and differential grease which is pumped from small containers which are frequently emptied with the result that air enters the intake of the pump, the grease having been removed from the container.

The object of my invention is to provide a means to separate gases such as air from liquids such as grease and to discharge liquids only through the main outlet opening and to discharge the gases through a secondary opening. The result of my invention is to provide a practical method for the rapid dispensing of grease directly from a pipe without the necessity of filling measuring containers with the grease to assure that air was not measured together with the grease by the measuring unit which in my drawing is shown as a liquid operated grease meter of the usual type.

Among the novel features of my invention are the installation within the pump cylinder of the means necessary to prevent gases from passing out of the main discharge outlet of the pump. The advantage of this construction is that these pumps are usually inserted through a circular hole in the top of the grease container so that it would be difficult, if not impossible in many cases, to have the lower part of the grease pump other than a cylinder without radial projections.

Another novel feature is the secondary discharge opening or openings for the gases leading into the upper part of the grease container so that if small quantities of grease pass out with the gases they are returned to the main supply of grease automatically, thus preventing this grease from getting on the exterior of the grease container.

In my drawing the figure is a central vertical longitudinal view of my improved liquid pump, showing a section through the pump cylinder and showing the outside of the liquid operated metering device and connecting piping. Pump cylinder 1 is within grease container 2 and passes through grease container cover 3 all in the usual manner. Driving pinion 4 and rack 5 are shown of conventional construction for moving the piston rod 6 up and down within pump cylinder 1. The exact method of accomplishing this movement is not limited to the construction shown but may be any conventional construction whereby piston rod 6 is given a reciprocating motion.

7 is the upper portion of the pump, enclosing rack 5. 8 is the main delivery opening of the pump on which is mounted liquid operated meter 9 which is of the usual type. 10 is the discharge pipe or tubing leading from liquid meter 9 and may be fitted with a conventional shut-off valve 11 which prevents the hose from draining when the pumping operation is stopped.

Elements 1 to 11 inclusive are all of conventional design and are not limited to the exact construction shown.

At the bottom of pump cylinder 1 is a conventional foot valve 12. 13 is a piston engaging the walls of pump cylinder 1 and fitted with valve disc 14 to allow the passage of liquid past piston 13 in one direction in the usual manner. Foot valve 12 and piston assembly 13 and 14 may be any of a number of conventional types and are not limited to the exact construction shown as the air separating parts of my invention have been successfully used with a number of different types of pistons and foot valves. 15 is a check valve mounted in the upper part of pump cylinder 1 which may be any of several designs. Its construction is such that a slight pressure will be required to open it to allow the flow of grease from the inlet of the pump toward the main outlet of the pump. It will substantially stop the flow of grease past it in the reverse direction.

In the construction shown piston rod 6 passe through the center of the valve which has the movable valve member 16 closely engaging piston rod 6. Piston rod 6 does not engage the other parts of the valve in the drawing which will allow piston rod 6 to have slight bends in it without wedging against check valve 15. 17 is the check valve spring which can be omitted in some instances. 18 is the upward stop for movable valve member 16 and is held firmly within pump cylinder 1 by conventional means. Check valve 15 may be made as a unit as shown in the drawing and may be held within pump cylinder 1 by means of pins 19 and 19 or any other conventional holding means.

Check valve 15 is a conventional check valve but if piston rod 6 is not true throughout its entire length with pump cylinder 1 the construction shown for movable valve disc 16 is advisable. 20 and 20 are gas discharge openings or orifices. A single opening can be used, or, as shown in the drawing, more than one opening.

The operation of the pump is as follows:

When pump piston 13 moves downward the grease in the lower part of pump cylinder 1 is forced through the piston to a position immediately above it. When pump piston 13 moves upward a fresh supply of grease is sucked in through foot valve 12 to fill the space directly below piston 13. The grease directly above piston 13 is forced through check valve 15 and out through the liquid operated meter 9. As opening 20 is small the amount of grease which may pass out through it is negligible and does not affect the operation of the pump. On the downward stroke of piston 13 check valve 15 holds the grease in the upper part of the pump.

When the level of the grease in container 2 is so low that the air directly above the surface of the grease can pass in through foot valve 12 there is a condition which until my invention has been very difficult to overcome.

The object of my invention is removal of air and gases which get into pump cylinder 1 and such air or gases are prevented from reaching liquid meter 9 by being forced out of pump cylinder 1 through opening 20. Prior to my invention attempts had been made to mechanically stop the movement of piston 13 when the level of the grease was near the bottom of the container but such constructions have not been practical.

When gases, which will be considered to be air as is usually the case, enter foot valve 12 they are forced along with the grease through piston 13 to a point directly above piston 13. Opening 20 is just below check valve 15 so that the air which collects just below check valve 15 will be free to pass out through opening 20. This is because when a mixture of grease and air is between piston 13 and check valve 15 within pump cylinder 1 the grease settles to the lower part of this space while the air rises to the upper part of the space and collects just under check valve 15. When piston 13 is moved upward the air passes out through opening 20 easily and the pressure between piston 13 and check valve 15 is not sufficient to open check valve 15 when air is present below check valve 15 and when such air is being forced out through opening 20. As piston 13 rises the air is forced out of opening 20 until a point is reached at which the body of grease above piston 13 reached opening 20.

It is a well known fact that the flow of a liquid through an orifice especially viscous liquids is lower than the flow of a gas through the same orifice. Because of this physical law a large amount of air can escape through opening 20 but only a negligible amount of heavy viscous liquids such as grease as is used for lubricating automobile transmissions and differentials. The small amount of grease which passes out through opening 20 is automatically returned to the main body of grease held within container 2. The use of the flow characteristics of a small orifice when passing gases as compared to that when passing liquids especially viscous ones is novel in a liquid pump especially in conjunction with a check valve directly above such orifice as shown in my drawing.

A further refinement of my invention which improves it slightly but which adds considerably to the cost is the use of sliding valve 21. This valve is mounted around piston rod 6 just below check valve 15 and closely engages the inner wall of pump cylinder 1. It is a loose fit around piston rod 6 so that grease may pass between it and piston rod 6.

22 is a stop to restrict the downward movement of sliding valve 21. When sliding valve 21 is in its upper position it covers opening 20 and substantially stops the flow through such opening. The action of sliding valve 21 is as follows:

When grease passes upward through the pump between piston rod 6 and sliding valve 21 there is an upward force exerted on sliding valve 21 due to the fluid friction of the grease flowing past the valve. This force when the grease is flowing causes sliding valve 21 to move upward covering opening 20. This prevents any grease from passing through opening 20 when only grease is present around sliding valve 21. On the other hand, when air is passing through the pump cylinder around sliding valve 21 it flows between sliding valve 21 and piston rod 6 easily, with the result that sliding valve 21 is not raised by the flow of the air but remains in its lower position against stop 22. This leaves opening 20 open to allow the free escape of air and other gases. This refinement is not necessary for the successful operation of my pump but increases the mechanical efficiency of the pump to a certain extent.

While my drawing shows a reciprocating piston type of pump, nevertheless my invention also covers the use of the flow retarding check valve and the gas discharge openings in connection with other types of liquid circulating means other than a reciprocating piston, as the flow retarding valve and gas discharge openings will function equally well regardless of the exact type of liquid circulating means as to their ability to prevent air and other gases from passing beyond the flow retarding check valve.

Having thus described my invention what I claim as new and desire to secure by Letters of Patent is:

1. In a liquid pump of the measuring type; a liquid operated meter; a pump inlet opening; a main delivery opening leading to the liquid operated meter; a liquid circulating device between said openings; a flow retarding check valve between said liquid circulating device and said main delivery opening; and a gas discharge opening between said check valve and said liquid circulating device, substantially as and for the purpose described.

2. In a liquid pump of the measuring type; a liquid operated meter; a pump inlet opening; a main delivery opening leading to the liquid operated meter; a liquid circulating device between said openings; a flow retarding valve between said liquid circulating device and said main delivery opening; a liquid supply container surrounding said inlet opening; and a gas discharge opening from the flow of liquid between said valve and said liquid circulatng device, discharging into said liquid supply container, substantially as and for the purpose described.

3. In a liquid pump of the measuring type; a liquid operated meter; a pump inlet opening; a main delivery opening leading to the liquid operated meter; a pump piston within said pump between said openings; a flow retarding check valve between said piston and said main delivery opening, and a secondary discharge opening between said check valve and said piston, substantially as and for the purpose described.

4. In a liquid pump of the measuring type; a pump inlet opening; a main delivery opening; a pump piston within said pump between said openings; a flow retarding valve between said piston and said main delivery opening; a liquid supply container surrounding said inlet opening; and a secondary discharge opening from the flow of liquid between said valve and said piston discharging into said liquid supply container, substantially as and for the purpose described.

5. In a liquid pump of the measuring type; a liquid operated meter; a main delivery opening leading to the liquid operated meter; a pump piston within said pump; a shaft operatively connected to said pump piston; a check valve between said piston and said main delivery opening, comprising a seat, and a movable valve disc closely engaging said shaft and radially movable relative to said seat; and a secondary discharge opening from said pump between said check valve and said piston, substantially as and for the purpose described.

6. In a liquid pump of the measuring type; a pump inlet opening; a main delivery opening; a pump cylinder; a reciprocating pump piston within said cylinder between said openings; a flow retarding valve within said cylinder between said piston and said main delivery opening; and a secondary discharge opening in the wall of said pump cylinder between said valve and said piston, and located closely adjacent to said valve, substantially as and for the purpose described.

7. In a liquid pump; a pump inlet opening; a main discharge opening; a pump cylinder; a reciprocating pump piston within said pump cylinder; a piston rod operatively connected to said pump piston; a flow retarding check valve within said cylinder between said piston and said main discharge opening; a liquid supply container surrounding said inlet opening; a gas discharge opening in the wall of said pump cylinder between said valve and said piston, located closely adjacent to said valve, and discharging into said liquid supply container; and a ring-shape sliding valve member having a path of travel along the inner wall of said pump cylinder, covering at one end of said path of travel said gas discharge opening, and encircling said piston rod, substantially as and for the purpose described.

8. In a viscous liquid pumping system, a liquid container, a liquid operated meter, a liquid circulating device, a conduit connecting said liquid circulating device with said meter, a discharge pipe beyond said meter, a shut-off valve in said discharge pipe, and a gas outlet between the liquid circulating device and the meter disposed so that the resistance to the flow of the viscous liquid through said meter and pipe causes discharge of gas from said liquid back into said liquid container.

9. In a viscous liquid pumping system, a liquid operated meter, a liquid circulating device, a conduit connecting said liquid circulating device to said meter, a discharge pipe beyond said meter, a shut-off valve in said discharge pipe, a gas outlet between the liquid circulating device and the meter disposed so that the resistance of the flow of the viscous liquid to said meter and pipe causes discharge of gas from said liquid, and spring means to add to said resistance.

10. In a grease pumping apparatus, the combination, with a container and a pump mounted thereon for pumping lubricant from the container, of a measuring meter in the discharge line of the pump, and an air escape in the discharge line of the pump to permit escape of air pumped prior to its entrance into the meter.

11. In a grease pumping apparatus, the combination, with a container and a pump mounted thereon for pumping lubricant from the container, of a measuring meter in the discharge line of the pump, and a by-pass connected to the pump discharge to permit escape of air pumped prior to its entrance into the meter.

12. In a grease pumping apparatus, the combination, with a container and a pump mounted thereon for pumping lubricant from the container, of a measuring meter in the discharge line of the pump, and a by-pass connected to the pump discharge to permit escape of air pumped prior to its entrance into the meter, said by-pass discharging into said container.

13. In a grease pumping apparatus, the combination, with a container and a pump mounted thereon for pumping lubricant from the container, of a measuring meter in the discharge line of the pump, an air escape in the discharge line of the pump to permit escape of air pumped prior to its entrance into the meter, and a check valve in the discharge line of the pump.

14. In a grease pumping apparatus, the combination, with a container and a pump mounted thereon for pumping lubricant from the container, of a measuring meter in the discharge line of the pump, a by-pass connected to the pump discharge to permit escape of air pumped prior to its entrance into the meter, and a spring loaded check valve in the discharge line of the pump.

15. In a grease pumping apparatus, the combination, with a container and a pump comprising a liquid circulating device and mounted on said container for pumping lubricant from the container, of a measuring meter in the discharge line from the liquid circulating device, and an air escape leading from the path of the grease between the liquid circulating device and the meter to permit escape of air pumped prior to its entrance into the meter.

16. In a grease pumping apparatus, the combination, with a container and a pump comprising a liquid circulating device and mounted on said container for pumping lubricant from the container, of a measuring meter in the discharge line from the liquid circulating device, and a by-pass leading from the path of the grease between the liquid circulating device and the meter to permit escape of air pumped prior to its entrance into the meter.

17. In a grease pumping apparatus, the combination, with a container and a pump comprising a liquid circulating device and mounted on said container for pumping lubricant from the container, of a measuring meter in the discharge line from the liquid circulating device, and a by-pass leading from the discharge between the liquid circulating device and the meter to permit escape of air pumped prior to its entrance into the meter, said by-pass discharging into the upper part of said container.

18. In a grease pumping apparatus, the combination, with a container and a pump comprising a liquid circulating device and mounted on said container for pumping lubricant from the container, of a measuring meter in the discharge line from the liquid circulating device, an air escape leading from the path of the grease ahead of the meter to permit escape of air pumped prior to its entrance into the meter, and a check valve in the discharge line from the liquid circulating device.

19. In a grease pumping apparatus, the combination, with a container and a pump comprising a liquid circulating device and mounted on said container for pumping lubricant from the container, of a measuring meter in the discharge line from the liquid circulating device, a by-pass leading from the discharge between the liquid circulating device and the meter to permit escape of air pumped prior to its entrance into the meter, and a spring loaded check valve between the meter and the liquid circulating device in the discharge line from the liquid circulating device.

ROBERT S. BASSETT.